United States Patent [19] [11] 3,905,302
Fink et al. [45] Sept. 16, 1975

[54] SWITCH, ESPECIALLY FOR MAGNETICALLY AND PNEUMATICALLY FLOATING VEHICLES

[75] Inventors: Peter Fink; Werner Gorlitz, both of Essen, Germany

[73] Assignee: Fried. Krupp Gesellschaft mit beschrankter Haftung, Essen, Germany

[22] Filed: Sept. 24, 1973

[21] Appl. No.: 400,321

[30] Foreign Application Priority Data
Sept. 28, 1972 Germany............................ 2247551

[52] U.S. Cl........... 104/130; 104/134; 104/148 MS; 246/428
[51] Int. Cl............................................. E01b 25/06
[58] Field of Search ........................... 104/130–132; 246/394, 428–430

[56] References Cited
UNITED STATES PATENTS
2,903,972  9/1959  Schutze............................... 104/130
3,472,176 10/1969  Trent................................... 104/130
3,536,909 10/1970  Czyl.................................... 246/428
3,735,709  5/1973  Matsumoto.......................... 104/130

Primary Examiner—M. Henson Wood, Jr.
Assistant Examiner—Richard A. Bertsch
Attorney, Agent, or Firm—Walter Becker

[57] ABSTRACT

A switch with a horizontally movable switch unit, especially for floating vehicles, which are supported by a track by means of magnetic or pneumatic forces, in which the switch unit is composed of a plurality of individual switch sections arranged one behind the other when looking in the direction in which a vehicle passes over the switch. The switch sections respectively carry track sections which in the end positions of the switch for a straight drive or a drive through a curve from a practically continuous track. The individual track sections respectively having associated therewith actuating means for moving the same selectively to the position corresponding to the desired effective position of the switch.

13 Claims, 12 Drawing Figures

FIG.5

SWITCH, ESPECIALLY FOR MAGNETICALLY AND PNEUMATICALLY FLOATING VEHICLES

The present invention relates to a switch with horizontally movable switch part, especially for floating vehicles which are supported on a driving path by means of magnetic or pneumatic forces.

For track bound land traffic systems, especially suspended railways or cableways, it is well known that in view of the high driving speeds switches are required which meet high safety requirements. Furthermore, there exists the requirement that the driving path elements of the switches differ as little as possible from the driving path elements of the normal driving path outside the switch region and consist of simple exchangeable elements which are adapted to be built together in a building block manner.

The driving path of land vehicle systems which are supported in a contact-free manner, is intended to carry the vehicles and to guide the same. The driving path element therefore generally consists of a horizontal guiding member on which the vehicle rests for instance by means of an air cushion or by means of magnetic forces, and furtheremore comprises a vertical guiding part which keeps the vehicle in its track or path. The vertical guiding part may furthermore be able to receive additional operating elements such as current feeding parts and rails for linear motors.

In addition to the driving path required for the normal operation of suspended railroads, there is in most instances additionally provided an auxiliary driving path. This auxiliary driving path will with electromagnetic floating systems, in case of disorders of operation, for instance in case of a failure of the energy, take over the task of the driving path. With electrodynamic floating or suspension systems, the auxiliary driving path or track, which may be designed as rail or as a concrete track, is required during the starting phase and the end phase of the movement of the vehicles.

Inasmuch as in curves the admissible transverse inclination is limited by means of magnetic or pneumatic forces of supported floating vehicles, and since on the other hand for driving dynamic and comfort reasons only limited free, unbalanced lateral accelerations are permissible, high driving speeds which may amount up to 500 kilometers per hour require very large radii of curvature (sometimes radii in the order of a plurality of kilometers). Ahead of and behind the curves, additionally so-called merging arcs are provided for making the transfer of the floating vehicles into the subsequent path sedtion as free from jerks as possible.

The design of the merging arcs and the great radii of curvature bring about that the switches of the above mentioned high speed driving systems have very great lengths. This is true in particular when for structural reasons in the branching off switch track no transfer inclination of the vehicle path and thus of the vehicle is possible. Depending on the driving speed, the width of the driving path and the admissible magnitude of the free lateral acceleration, such switches may have a length of several hundred meters.

Passive switches, which mean switches without mechanically movable switch parts, require for a safe support and guiding of the floating railroads during the operation of the switch, a great number of auxiliary devices. With some traffic systems, principally no passive switches can be employed.

Switches with movable switch parts, in other words, active switches, can, in view of the large dimensions of the switch parts to be moved as one piece, be made only when using a great number of technical elements.

It is, therefore, an object of the present invention to provide a switch which can be used in particular also for high speed suspended or floating vehicles which switches are equipped with driving path elements which will differ only slightly from driving path elements of the ordinary track.

It is another object of this invention to provide a switch of the type set forth in the preceding paragraph, which with regard to auxiliary devices required for operation are relatively inexpensive.

It is still another object of this invention to provide a switch as set forth above which can be used for all land traffic systems regardless of the construction of the driving path or track.

These and other objects and advantages of the invention will appear more clearly from the following specification in connection with the accompanying drawings, in which:

FIG. 3a is a section similar to that of FIG. 2 through a switch with an auxiliary device comprising permanent magnets, said auxiliary device being shown as turned by 90°.

FIGS. 3b and c illustrate different positions of the permanent magnets in the base surface, which cause repelling forces or attracting forces respectively between the permanent magnets of the base surface and the individual sections of the switch.

The switch according to the present invention, which is provided with a horizontally movable switch part and is intended in particular for floating vehicles which are supported on a driving path by magnetic or pneumatic forces, is characterized primarily in that the switch part comprises a plurality of individual elements which when viewing in the direction of the driving path are movable relative to each other and which are substantially identical and provided with driving path sections which in the end positions of the switch for straightforward drive and when driving through a curve form a continuous driving path section while the individual elements are respectively connected with displacing devices which are substantially of the same type for the switch-over operation of the switch into the desired end position and rest on a common plane base surface.

The base surface and/or the individual parts are advantageously equipped with auxiliary devices by means of which the individual elements are adapted to be lifted off from the base surface and are also adapted to rest thereon in a contact-free manner. The individual elements which during the switch-over operation of the switch are moved into a floating condition, are thus able to be moved in a friction-less manner for all practical purposes.

The individual elements can be lifted off in a simple manner by admitting compressed air or hydraulic fluid by means of auxiliary devices between the individual elements and the base surface so as to create an air cushion or liquid film between the individual elements and the base surface.

According to a preferred embodiment of the invention, the auxiliary devices primarily consist of pairs of magnets which are arranged in the individual elements and in the base surface and with which the coordination of oppositely located poles is adjustable while the intensity of the forces of attraction and repulsion acting between magnets associated with each other will be adjustable.

As magnets, expediently electromagnets are employed which are pole reversible and are adjustable in an infinitely variable manner, i.e. without steps.

It is, however, also possible in the individual elements and the base surface to arrange pairs of permanent magnets the forces of attraction and repulsion of which are adjustable by turning one of the permanent magnets associated with each other.

For securing the end position of the individual elements, the electro or permanent magnets are so controlled that in the base surface and in the individual parts differently poled magnetic poles face each other.

According to a further development of the invention, the base surface has stationary end abutments against which laterally rest the individual parts in their positions which correspond to the end positions of the switch. The individual parts are expediently provided with guiding element by means of which the possibility of movement of the individual parts is determined relative to the base surface during the shift-over operation. The guiding elements will assure that individual elements will after completion of the shift-over operation always assume the same position which makes possible the straightforward drive or the drive through a curve.

According to a preferred embodiment of the switch according to the invention, the individual elements respectively support a curve as well as a straight track piece. The individual elements by means of guiding paths engaging the grooves in the base surface are displaceable perpendicularly with regard to the longitudinal axis of the straight driving path section into the end position for straight forward drive or for drive through a curve. As displacing devices, hydraulically or pneumatically operable piston units, electric drives as well as combinations of these devices may be employed.

One of the important advantages of this construction consists in that the curved driving path section may be inclined relative to the straight driving path section and may be arranged on the individual parts which means that the arced outer driving path element is elevated relative to the arced inner driving path element. When driving through a curve, the suspended or floating railroads may be subjected to lateral forces which also within the region of the switch can at least partially be compensated for by a corresponding transverse inclination of the driving path or track.

Another advantageous design of the arrangement according to the invention consists in that the individual parts or sections are equipped with a straight driving path section which after displacement into its end position for driving through a curve forms with the driving path sections of the remaining individual sections a polygonal driving path section. The polygonal shape approaching the shape of a circle is admissible in view of the magnitude of the radius of curvature of the switches pertaining to suspended or floating railroads.

The individual sections equipped with straight driving path sections are expediently provided with guiding pins which engage circular grooves having a common center of curvature and provided in the base surface. The individual sections may, however, expediently be guided also by joints which interconnect adjacent sections on that side which in the end position for driving through a curve face toward the pertaining center of curvature.

Advantageously, the switch is so designed that the component of the individual sections which are elastically deformable are not interrupted at the butt joints of the individual sections or elements but are arranged in a continuous manner and viewing in the longitudinal direction of said individual elements are connected merely within the central region thereof. The components which in contrast to the driving path do not have to be divided in sections comprise the vertical and horizontal guiding parts, the current feeding parts, the rails for linear motors as well as the rail serving as auxiliary driving path or track. These normally metallic operational elements can be so arranged on the individual sections that in spite of the polygonal design of the driving path, a continuous arc will be obtained in the curve defining end position.

The individual sections which are linked to each other may expediently also be provided with a continuous auxiliary driving path or track which is associated with the driving path sections and which consists of elastically deformable material and, when viewed in the longitudinal direction of the individual sections is connected thereto only within the region of the central portion of the individual sections. Due to the movability of the auxiliary driving path, a continuous arc of the auxiliary driving path is obtained in spite of the polygonal design of the driving path.

For purposes of protecting the base surface and thereby the individual sections against influences of the surroundings, the individual sections are on both sides provided with protruding protective sheet metal parts which protect toward the outside that part of the base surface which is not covered by the individual sections.

Within the scope of the subject matter of the present invention, heating elements may be built into the individual sections within the region of their contacting surfaces. These heating elements are intended to prevent a freezing of the individual sections for instance to the base surface and to prevent the formation of ice buffers by means of which the shifting of the switch from one position to another position could be impeded.

Figure 1A:
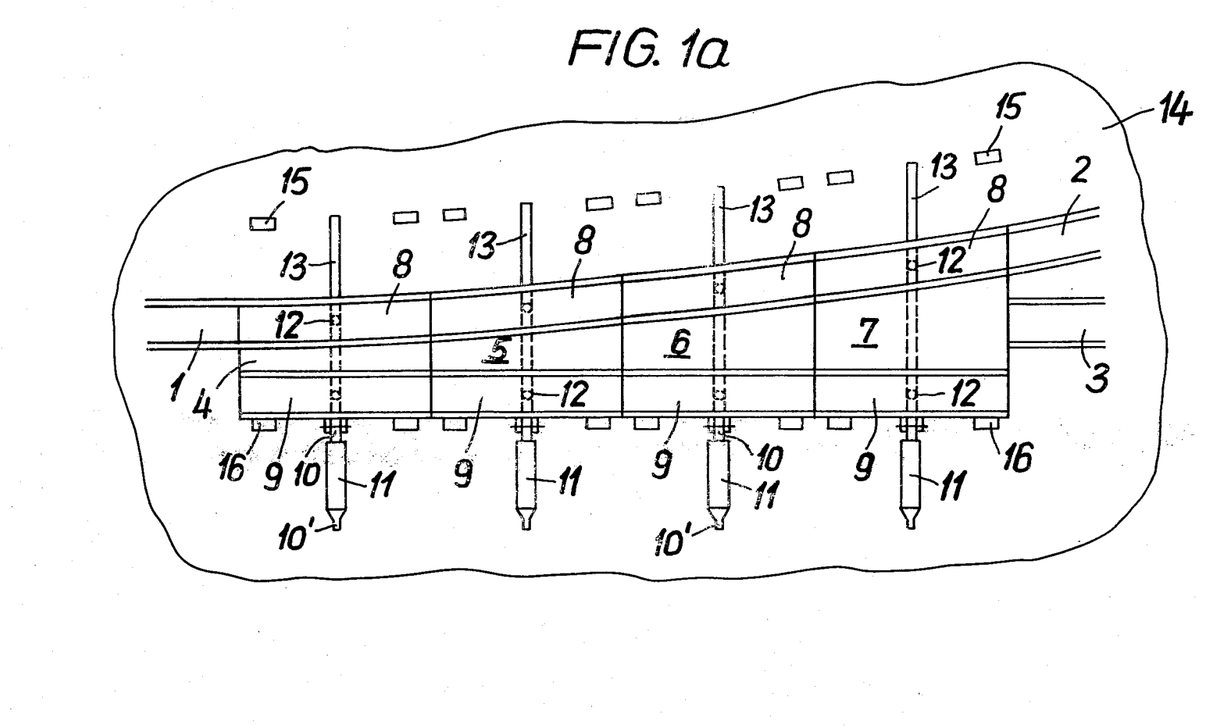
FIGS. 1a and 1b respectively illustrate a top view of a switch in the end position for curves and in the position for driving straight ahead respectively.

Referring now to the drawings in detail, the switch equipped with a horizontally movable switch part represents a connection between the driving track 1 and the driving track 2 and 3 respectively. The switch part comprises a plurality of similar individual sections 4, 5, 6 and 7 which are movable relative to each other and which include a curved as well as a straight track section 8, 9 respectively (FIGS. 1a and 1b).

The individual sections 4–7 are connected respectively through joints 10, 10' to stationary displacing devices 11, said joints permitting vertical movements of the individual sections. In order to assure a precise guiding of the individual sections, these individual sections are equipped with guiding pins or pivots 12 which may comprise slides or rollers and which engage grooves 13 in the base surface 14. The grooves 13 are parallelly arranged with regard to each other and extend at a right angle with regard to the longitudinal axis of the straight driving track section 9.

Anchored to the ground surface 14 on which the individual sections 4–7 are supported, are stationary end abutments 15 and 16 against which the individual sections laterally abut when the individual sections occupy the positions corresponding to the end positions of the switch. The end abutments 16 absorb the lateral forces which occur when the vehicle passes through a curve (FIG. 1a).

Figure 1B:
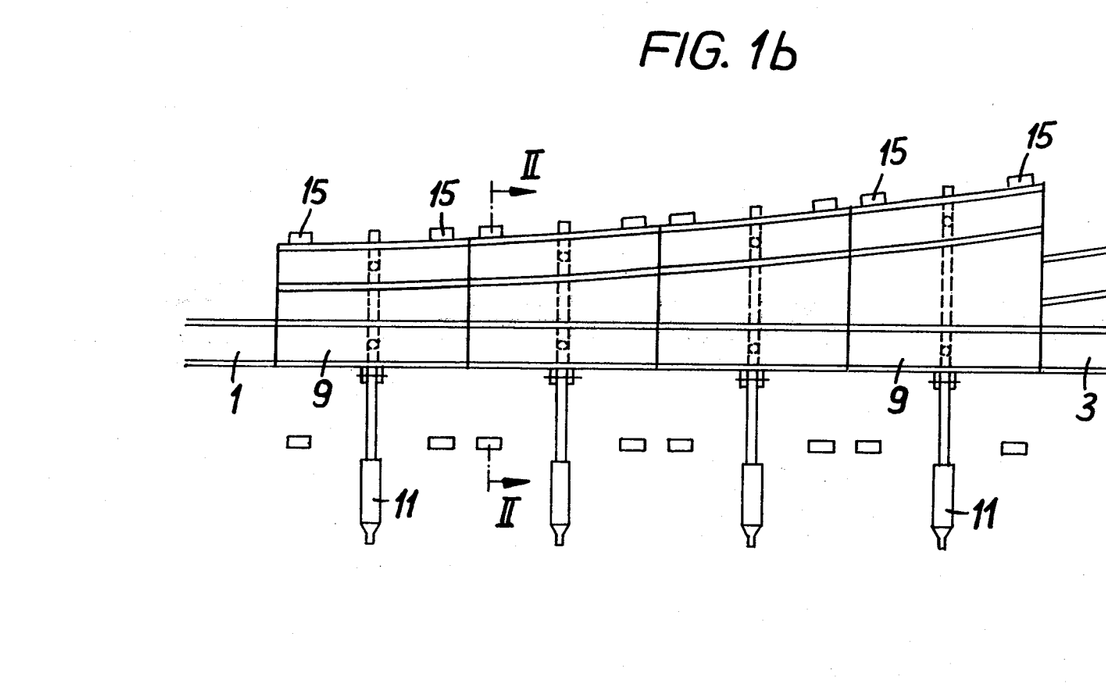

In FIG. 1b, the switch occupies its position for straight ahead driving. The individual sections 4–7 have been pressed by the displacing devices 11 against the end abutments 15. The straight track sections 9 connect the track 1 with the track 3.

For purposes of facilitating the switching operation, the individual sections are equipped with an auxiliary device by means of which they can be lifted off the base surface 14 and in this way can for all practical purpose in a frictionless manner be brought into the desired end position.

The auxiliary device may comprise for instance a pressure fluid conveying conduit 17 which communicates with discharge openings 18 (FIG. 2), said openings 18 being distributed over the bottom surface 5' of the individual section 5 and of the other sections. The pressure fluid conveying conduit 17 is in its turn connected to a pressure producing unit 17' — for example an air compressor or a hydraulic fluid pump — which furnishes compressed air or hydraulic fluid under pressure respectively.

Figure 2:
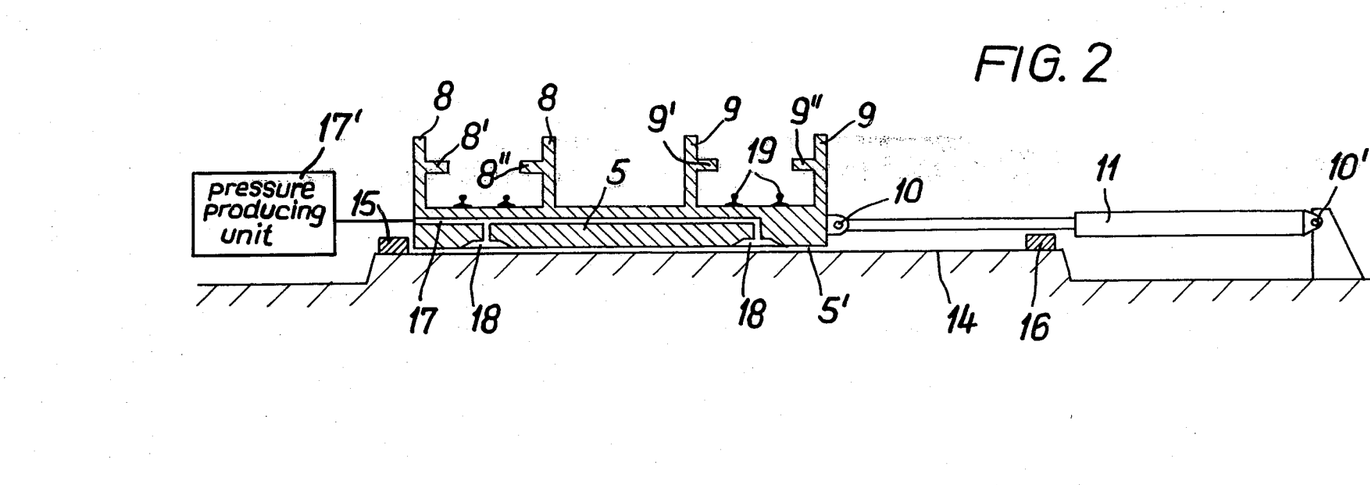
FIG. 2 is a section taken along the line II—II of FIG. 1b, said section extending through a switch with pneumatic of hydraulic auxiliary devices.

The pressure medium which is discharged through the openings 18 forms between the bottom surface 5' and the base surface 14 a supporting layer on which the respective individual section can be moved back and forth at low power requirement. The switching operation can be braked in a simple manner by reducing the supply of pressure fluid or stopping it altogether.

The track sections 8 and 9 respectively comprise two track elements 8', 8" and 9', 9" which are provided with transverse supports. These transverse supports are covered for instance with permanent magnets by means of which (not illustrated) the vehicle is supported which is likewise equipped with permanent magnets. Between the track elements there are additionally arranged rails 19 which can be used as auxiliary track. The switch and the individual sections may, of course, also be provided with a differently designed track and auxiliary track respectively.

Figures 3A, 3B, 3C:
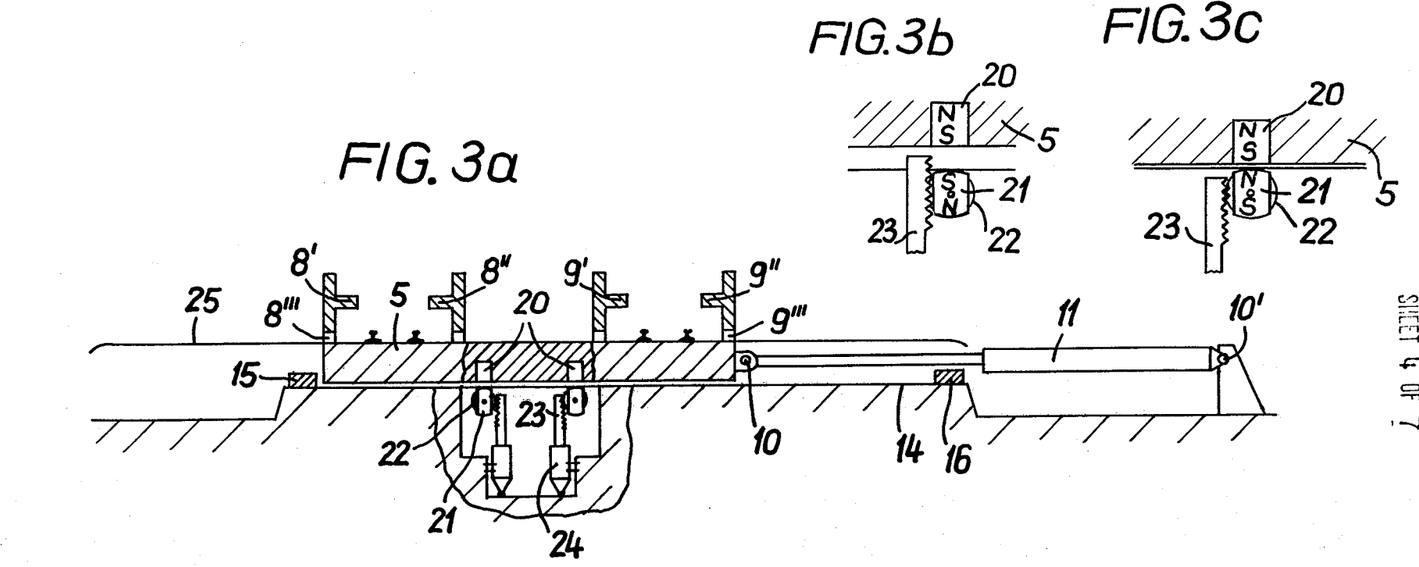

FIG. 3 shows an auxiliary device equipped with permanent magnets 20 and 21 respectively for lifting and lowering the individual section 5. Opposite the permanent magnets 20, which are mounted in the individual section and which are arranged transverse to the longitudinal axis of the individual section are permanent magnets 21 which are rotatably journalled in the base surface. These permanent magnets 21 are provided with gears 22 which can be actuated by means of gear racks 23 through the intervention of pistons 24 that may be driven pneumatically, hydraulically or electrically.

According to FIG. 3, permanent magnetic poles of the same polarity face each other so that the individual section will be lifted off the base surface 14 by repelling forces between the permanent magnets 20 and 21. If the permanent magnets 20 and 21 with poles N and S have the same polarity (FIG. 3b), the repelling force has its greatest amount. By rotating the permanent magnets 21 the total repelling force gradually can be reduced and the indiviual section can be lowered. If the polarity of the permanent magnets is different, i.e. pole S of magnet 20 lies in front of pole N of magnet 21 (FIG. 3c), the individual section is pulled down to the base surface 14 by means of the attracting forces between the magnets.

Instead of the permanent magnets, it may also be advantageous to employ electromagnets which can be controlled in an infinitely variable manner. Inasmuch as these electromagnets are adapted to change their polarity in a very simple manner, they do not require any mechanical adjusting mechanism which means that they can be installed stationarily in the base surface 14 and in the individual sections.

For purposes of protecting the individual sections against inclement weather and other influences, they are on both sides provided with protruding protective sheet metal plates 25 which cover the respective part of the base surface that is not covered by the individual sections.

The track section elements 8', 8", 9', 9" have their lower range provided with discharge openings 8'" and 9'" which serve for drainage of the water from the individual sections.

Figure 4:
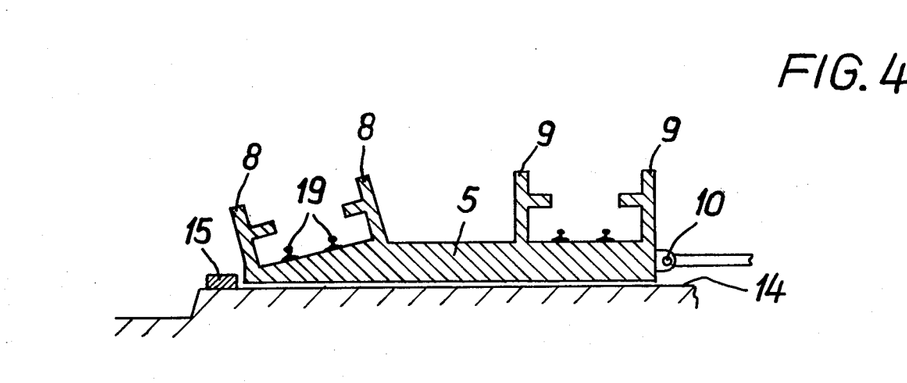
FIG. 4 is a section similar to that of FIG. 2 through a switch having its curved driving path inclined.

For purposes of equalizing the lateral forces which act upon the vehicles when passing through the curves, the curved track sections 8 as well as the rail 19 associated therewith may be arranged at an incline as shown in FIG. 4.

Figure 5:
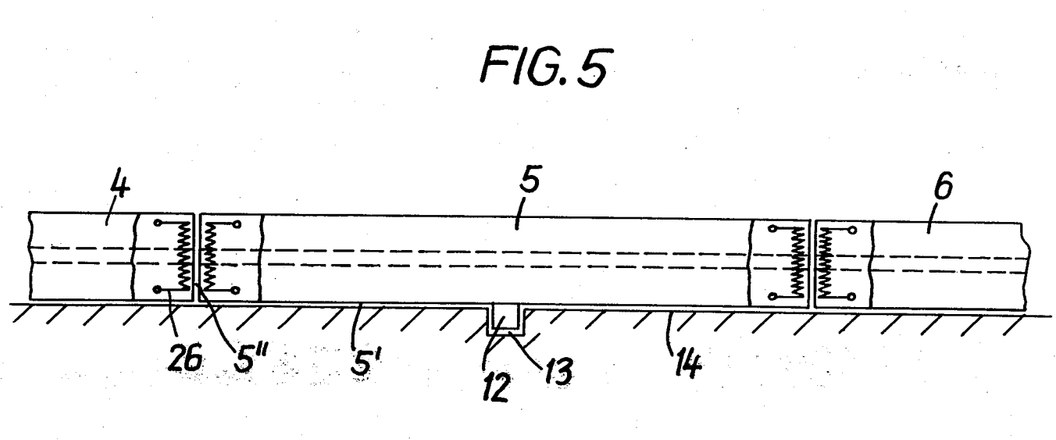
FIG. 5 is a side view of a switch section according to FIG. 1b.

In order to prevent a blocking or jamming of the switch due to the formation of ice, the butt joint surfaces 5" (FIG. 5) and as the case may be also the bottom surfaces 5' and the lateral surfaces of the individual sections are within the region of the end abutments equipped with heating elements 26.

In contradistinction to the switch design described so far, the individual sections 4–7 may support only straight track sections 27–30 of uniform design (FIG. 6) which after the switch has been shifted into its end position for driving through a curve form a polygonal track section. The individual sections have connected thereto guiding pins 31 which engage or extend into circular grooves 32–35 provided in the base surface 14. The common center of curvature of the grooves is located in the pivot point "M".

The guiding of the individual sections 4–7 may also be effected by means of joints 36 (FIGS. 7a, 7b) which interconnect the individual sections located on that side which faces toward the center of curvature for driving through a curve and also connect said individual sections to the driving track 1. These joints will assure that the individual sections will in the end positions of the switch always occupy the same position.

Figures 6, 7A, 7B:
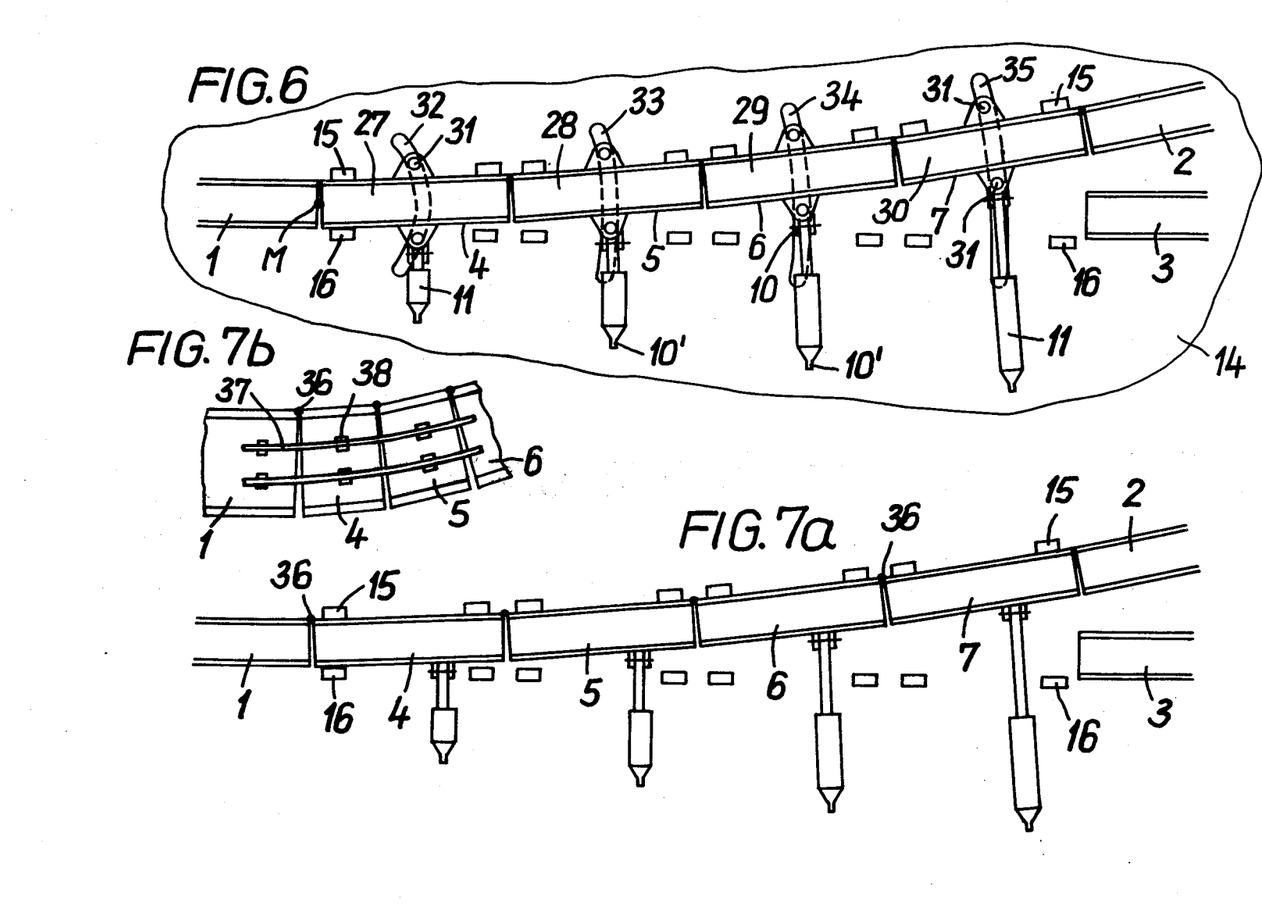
FIG. 6 is a top view of a switch with arcuate curves and guiding paths.
FIGS. 7a and 7b illustrate a top view of a switch according to the invention with individual elements connected thereto by joints.

The individual sections of the type illustrated in FIG. 7b are equipped with a continuous auxiliary track 37 which is made of elastically deformable material and is connected to the individual sections only at the places 38. The auxiliary track will thus be able in spite of the polygonal design of the track to assume a continuous curvature. Corresponding remarks also apply for other elastic components of the individual sections which have not been illustrated in order not to unnecessarily clog up the drawing.

Each of the places 38 consists of two clamps which are connected by screws to the individual sections of the switch and track 1. The inner ends of the clamps rely on the foot of track 37 which may be constructed as rail 19 shown in FIG. 2 or FIG. 4.

Figure 8:
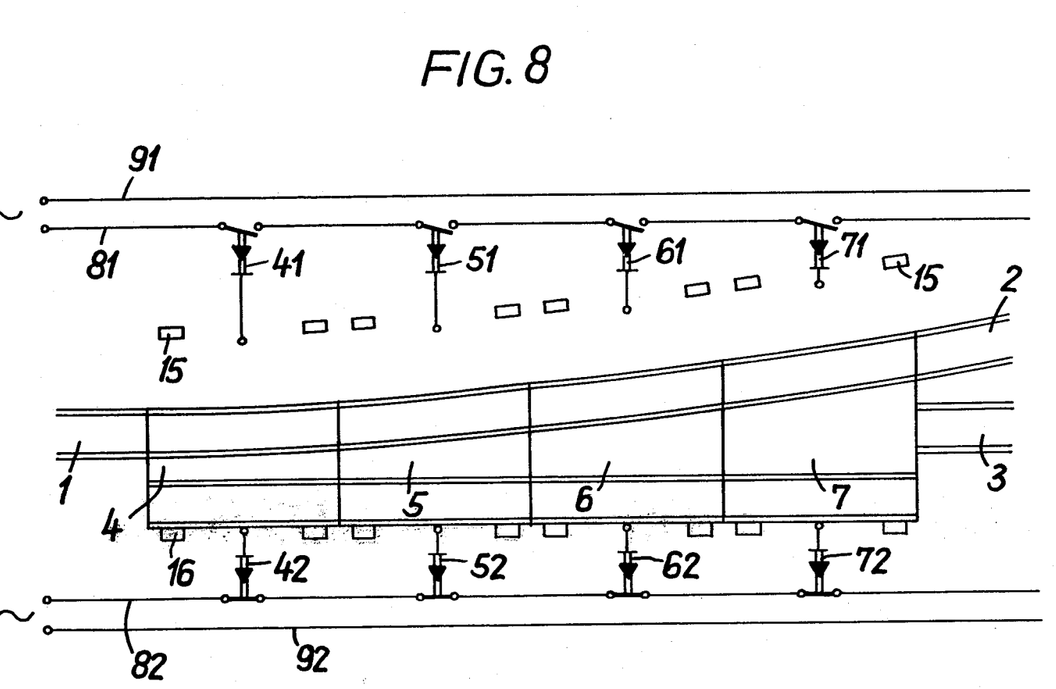
FIG. 8 shows the control diagram for a switch safety system.

The individual sections 4–7 have respectively associated therewith two control elements 41, 51 . . . 71; 42, 52 . . . 72 which are built into the circuits comprising the phases 81 and 91; 82 and 92 (FIG. 8). The circuits which are connected to a train safety system (not illustrated) are closed only when all individual sections have reached the end position either for straightforward drive or for driving through a curve.

The connection of the track section 1 with the track section 2 is freed for passing therethrough when the control elements 42, 52, 62, 72 are closed. The circuit 81, 91 is in this instance not closed so that the switch will not be able to be passed through from the direction of the track 3.

The advantage of the present invention consists primarily in that the individual sections of the switch consist of structural elements which correspond to those of a normal track. The switch is furthermore suitable for all suspension or floating systems inasmuch as its applicability does not depend on the structure of the employed track.

It is, of course, to be understood that the present invention is, by no means, limited to the specific showing in the drawings but also comprises any modifications within the scope of the appended claims.

What we claim is:

1. A switch, especially for magnetically and pneumatically floating vehicles, which includes: horizontally displaceable switch means comprising a plurality of individual switch sections arranged one behind the other in the direction in which a vehicle is to be driven over said switch, said switch means including a plurality of track sections movable selectively to a position for forming a curved track to guide a vehicle through a curve and also movable selectively to a position to form a substantially straight track to guide a vehicle along a straight path, actuating means operatively connected to said track sections for selectively moving the same to the desired positions for forming a curved track and a straight track respectively, supporting means supporting said actuating means, said supporting means including a base surface common to and adapted to support all of said switch sections, and auxiliary means associated with said supporting means and operatively connected to said switch sections for selectively lifting the same off and causing the same to be supported by said base surface in a contact-free manner.

2. A switch according to claim 1, in which said supporting means includes a base surface common to and adapted to support all of said switch sections.

3. A switch according to claim 1, which includes abutment means arranged on said supporting means on opposite sides of said switch means for engaging the same in said first mentioned and second mentioned positions of said track sections.

4. A switch according to claim 1, which includes guiding means associated with said track sections for controlling the movement of the latter relative to said supporting means during the movement of said switch means from one position to another position and vice versa.

5. A switch according to claim 4, in which said guiding means include groove means in said supporting means and also include guiding pin means on said switch sections for engaging said groove means and guiding said switch sections so as to move with regard to said straight track sections of said switch sections.

6. A switch according to claim 5, in which all of said groove means are formed by coaxial grooves arranged in spaced relationship to each other.

7. A switch according to claim 1, in which each of said switch sections comprises a straight track section, and in which all of said straight track sections on said switch sections when moved substantially at right angles into position for forming a curved track define a polygon.

8. A switch according to claim 7, which includes a plurality of linking means adjacent straight track sections together, said linking means being arranged on that side of said straight track sections which faces toward the center of curvature of said curved track adapted to be formed by said straight track sections.

9. A switch according to claim 1, which includes protective cover means extending in the direction of movement of said actuating means while projecting rigidly from said track sections beyond opposite sides thereof over adjacent portions of said supporting means.

10. A switch, especially for magnetically and pneumatically floating vehicles, which includes: horizontally displaceable switch means comprising a plurality of individual switch sections arranged one behind the other in the direction in which a vehicle is to be driven over said switch, said switch means including a plurality of track sections movable selectively to a position for forming a curved track to guide a vehicle through a curve and also movable selectively to a position to form a substantially straight track to guide a vehicle along a straight path, actuating means operatively connected to said track sections for selectively moving the same to the desired positions for forming a curved track and a straight track respectively, supporting means supporting said actuating means, said supporting means including a base surface common to and adapted to support all of said switch sections, and auxiliary means associated with said switch sections for selectively lifting said switch sections off said base surface and causing said switch sections to be supported by said base surface in a contact-free manner.

11. A switch according to claim 10, which includes heating means arranged within the region of the contacting surfaces of said switch sections.

12. A switch, especially for magnetically and pneumatically floating vehicles, which includes: horizontally displaceable switch means comprising a plurality of individual switch sections arranged one behind the other in the direction in which a vehicle is to be driven over said switch, said switch means including a plurality of track sections movable selectively to a position for forming a curved track to guide a vehicle through a curve and also movable selectively to a position to form a substantially straight track to guide a vehicle along a straight path, actuating means operatively connected to said track sections for selectively moving the same to the desired positions for forming a curved track and a straight track respectively, supporting means supporting said actuating means, said supporting means including a base surface common to and adapted to support all of said switch sections, said supporting means including auxiliary means for selectively lifting said switch sections off and causing the same to be supported by said base surface, said auxiliary means including magnetic means respectively associated with said switch sections and said base surface, said magnetic means being so arranged that the magnetic means of said switch sections are located opposite magnetic means on said base surface, and means for varying the intensity and the polarity of the magnetic means located opposite each other on said switch sections and said base surface.

13. A switch, especially for magnetically and pneumatically floating vehicles, which includes: horizontally displaceable switch means comprising a plurality of individual switch sections arranged one behind the other in the direction in which a vehicle is to be driven over said switch, said switch means including a plurality of track sections movable selectively to a position for forming a curved track to guide a vehicle through a curve and also movable selectively to a position to form a substantially straight track to guide a vehicle along a straight path, actuating means operatively connected to said track sections for selectively moving the same to the desired positions for forming a curved track and a straight track respectively, and supporting means supporting said actuating means, said switch sections being elastically deformable and uninterrupted at their butting areas and when viewed in the longitudinal direction thereof being fastened only at their central areas.

* * * * *

UNITED STATES PATENT OFFICE
CERTIFICATE OF CORRECTION

Patent No. 3,905,302            Dated September 16, 1975

Inventor(s) Peter Fink et al.

It is certified that error appears in the above-identified patent and that said Letters Patent are hereby corrected as shown below:

In the Abstract: line 10, "from" should read -- form --.

Signed and Sealed this second Day of *December 1975*

[SEAL]

Attest:

RUTH C. MASON
*Attesting Officer*

C. MARSHALL DANN
*Commissioner of Patents and Trademarks*